United States Patent Office 3,283,002
Patented Nov. 1, 1966

3,283,002
PROCESS FOR PREPARING BIS CYCLOHEXYL-
AMINE COMPOUNDS
Loren D. Brake, Wilmington, Del., assignor to E. I. du
Pont de Nemours and Company, Wilmington, Del., a
corporation of Delaware
No Drawing. Filed Apr. 13, 1965, Ser. No. 447,915
16 Claims. (Cl. 260—563)

This application is a continuation-in-part of my copending application Serial No. 245,418 filed December 18, 1962, and now abandoned.

This invention relates to the conversion of bis-cyclohexanol compounds to the corresponding bis-cyclohexylamine compounds.

Amination of alcohols has normally been carried out in a vapor phase reaction by passing the alcohol in vapor form over a catalytic material. Although satisfactory in the amination of some materials, such vapor phase reactions tend to produce an undesirable amount of olefinic derivatives and other decomposition products. The result has been low yields and an aminated product requiring expensive and complicated recovery procedures and equipment.

Some attempts have been made to overcome the difficulties referred to above by carrying out amination reactions of alcohols in the liquid phase at elevated temperatures and pressures. Such prior attempts at liquid phase amination reactions have, so far as I know, been limited to the amination of saturated aliphatic alcohols. Even then, for converting saturated aliphatic alcohols to the corresponding amines, such prior procedures are characterized by disappointingly low yields.

According to the present invention, I have now discovered an efficient and economical process which aminates, with resulting excellent yield and excellent conversion rates, diols of the following Formulas 1 and 2:

(1)

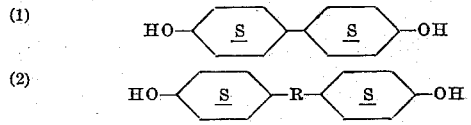

(2)

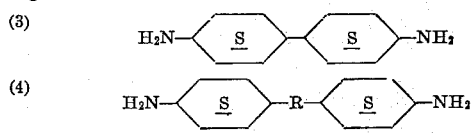

where R is selected from the group consisting of methylene, isopropylidene, ethylidene, beta-butylidene, beta-pentylidene, gamma-pentylidene, cyclopentylidene, cyclohexylidene and hexahydrobenzylidene.

According to my process, diols of Formulas 1 and 2 are reacted in the liquid phase and at elevated temperatures with ammonia, at autogenous pressure and in the presence of a hydrogenation catalyst. The products are the corresponding di-amino substituted compounds of the following Formulas 3 and 4:

(3)

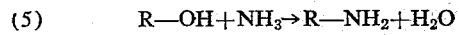

(4)

where R has the same meaning as above.

It is particularly surprising that this reaction proceeds with good conversion and good yield because it is well known that the secondary alcohols of Formulas 1 and 2 above are easily subject to dehydration with resulting formation of the undesired corresponding cycloalkene derivatives. Since my reaction appears to be a simple conversion of an alcohol to an amine according to the following equation:

(5) $R—OH + NH_3 \rightarrow R—NH_2 + H_2O$ and as shown the reaction appears to be a simple dehydration reaction, one would expect that a conventional dehydration catalyst would be most satisfactory. However, I have found that this is not true. I have found that the outstanding results I can obtain are surprisingly most satisfactory when the "dehydration" reaction of Equation 5 above is carried out, not in the presence of a dehydration catalyst, but rather in the presence of a hydrogenation catalyst.

As mentioned above, my reaction will be carried out at elevated temperatures. Since it is essential that my reaction be carried out in liquid phase with the starting diol in the liquid phase, the pressure will of course be at least that required to maintain the diol in liquid form at the reaction temperature, i.e. autogenous pressure. In order for the reaction to proceed at an economical rate, elevated temperatures are required, and temperatures within the range from 200° to 400° C. are entirely satisfactory. Preferred temperatures are from 250° to 350° C. with particularly advantageous results being obtained in the narrow range from about 275° to 325° C.

Ammonia will preferably be used in my reaction in an amount somewhat in excess of the stoichiometric amount required to react with the diol. While a stoichiometric amount, i.e. 2 mols of ammonia for each mol of diol, and above is satisfactory, I prefer to use from about 4 to 10 mols of ammonia for each mol of diol. There is no upper limit on the amount of ammonia that can be used although economic considerations will usually keep the figure below about 200 and preferably even below about 50 mols of ammonia for each mol of diol.

Hydrogenation catalysts are a well recognized class of catalytic agents and any of them are suitable for use in the process of my invention. Illustrative of suitable hydrogenation catalysts can be mentioned those comprised of nickel, cobalt, and the like as well as catalytic noble metals such as platinum, palladium, iridium, rhodium, rhenium and osmium, including supported forms of the catalytic metals on such conventional carriers as alumina, silica, carbon and the like. Raney nickel and Raney cobalt are especially advantageous. Particularly outstanding conversions and yields are obtained using as the hydrogenation catalyst ruthenium, either in the form of a finely divided free metal, or in the form of a compound which is reducible to metallic ruthenium such as ruthenium oxides for example, ruthenium sesquioxide, dioxide and tetraoxide; perruthenites, for example, barium perruthenites; ruthenates, for example, barium, potassium, sodium, silver, calcium, strontium and magnesium ruthenates; perruthenates, for example, potassium and sodium perruthenates; ruthenium halides, such as ruthenium pentafluoride and ruthenium dichloride, trichloride and tetrachloride; ruthenium chloro salts, for example, potassium chloroperruthenate; ruthenium sulfides such as ruthenium disulfide and trisulfide; ruthenium sulfates and the like. Such a catalyst can be activated by treatment with hydrogen to form the metallic ruthenium prior to use; in some instances such as with ruthenium dioxide, the catalyst can be activated by reaction with the ammonia in the system. Preferably, the ruthenium catalyst is supported on a suitable carrier such as charcoal, silica gel, alumina, asbestos, magnesium oxide, aluminum oxide monohydrate (boehmite), kieselguhr or other catalyst support known in the art.

As will be understood, the amount of catalyst which can be used can vary over a broad range with the lower limit being determined by the amount desirable to catalyze the reaction and the upper limit largely determined by economics. For example, it is satisfactory to use in my process a hydrogenation catalyst in an amount from about 0.01% to as high as 25% or more by weight based on the weight of the starting diol. I prefer from about 0.1 to 10% by weight of catalyst.

In a preferred method of carrying out my process, on a batch scale, the reactants including the diol, catalyst and ammonia in the amounts prescribed above are charged to a suitable reactor vessel, such as a shaker tube or an autoclave, and heated to the desired temperature. The reactor is allowed to hold at autogenous pressure during the reaction. The reaction normally appears to start almost immediately upon reaching the prescribed temperature and, of course depending upon the volume of reactants, is completed within a period of from about 5 minutes to 5 hours, more or less. Additional holding at the elevated temperature does not appear to do any harm but no advantage is seen by so doing.

Although I prefer to carry out my reaction in the absence of any solvent medium for the reactants, it is entirely satisfactory to carry out the reaction in a solvent system. Illustrative of suitable solvents that can be used are water, ethers such as dioxane, isopropyl ether and dibutyl ether, and tetrahydrofuran.

Following the reaction, the contents of the vessel are cooled and returned to ambient pressure. The resulting product upon analysis shows almost no unreacted diol. Furthermore, yields which I have obtained typically exceed 85% of desired diamine based on the starting diol and even as high as 92–94% and greater.

In addition to the desired diamine and possibly a very small amount of unreacted diol, the product mixture may also contain a small amount of a half aminated product, i.e. wherein only one of the hydroxyl groups of the diol has been replaced with an amino group. However, where the reaction is continued for a sufficiently long period of time, such incompletely reacted materials will constitute almost a negligible portion of the reaction mixture. In any event, it is a relatively simple matter to recycle such materials back into the process for completion of the amination reaction, as will be readily understood. The desired diamine product can be recovered in pure form by simple distillation.

Although I have described my process above with the starting material always being a bis-cyclohexanol compound, and such bis-cyclohexanol compounds are well known in the art and many of them commercially available, in a particular adaptation of my process I have found that I can start with unsaturated bis-phenol compounds corresponding to those bis-cyclohexanols of Formulas 1 and 2 above, hydrogenate the bis-phenol to the corresponding saturated derivative, and then carry out the amination reaction of my invention using the hydrogenation catalyst to obtain the desired bis-cyclohexyl amine of Formulas 3 and 4 above. The hydrogenation of the bis-phenol to the corresponding bis-cyclohexanol can be carried out using conventional procedures, for example, a solvent such as those disclosed above for the amination reaction can be used, and a hydrogenation catalyst such as ruthenium, cobalt or nickel can be used.

The products of my process, i.e. the diamines of Formulas 3 and 4 above, are useful as intermediates for the production of corresponding polyamides by reaction with dibasic acids according to techniques well known to those skilled in polymer and polyamide fiber preparation.

This invention will be better understood by reference to the following illustrative examples wherein parts are by weight unless otherwise indicated:

Example 1

One hundred parts by weight of 4,4'-isopropylidene dicyclohexanol, 50 parts by weight of ammonia and 2 parts by weight of 5% by weight ruthenium on an alumina support are charged to a 400 cc. shaker tube. The temperature is increased to about 275° C. and held for a period of 2 hours. The contents of the shaker tube are then removed and the catalyst is removed from the mass by filtration. The filtrate is distilled and an 85% yield of 4,4'-isopropylidene dicyclohexylamine is obtained.

Example 2

Example 1 is repeated except that the temperature used is 250° C., with similarly satisfactory results.

Example 3

Example 1 is repeated except that 100 parts by weight of ammonia is used instead of 50 parts. A yield of 83% is recovered according to the method described in Example 1.

Example 4

Example 1 is a repeated except that 75 parts by weight of the 4,4'-isopropylidene dicyclohexanol and 75 parts by weight of ammonia is used. One-fourth of one part by weight of ruthenium dioxide is used as the catalyst. After holding the reaction mass for 2 hours at 275° C., the product was recovered as in Example 1 in a yield of 92%.

Examples 5–11

Example 1 is repeated except substituting the catalyst listed in the following examples for the catalyst of Example 1. Similarly excellent results are obtained.

| | Example |
|---|---|
| Activated cobalt catalyst | 5 |
| Raney nickel | 6 |
| Nickel on kieselguhr support | 7 |
| Palladium on carbon support | 8 |
| Palladium on alumina support | 9 |
| Ruthenium on alumina support | 10 |
| Rhodium | 11 |

Example 12

Example 1 is repeated except using 75 parts by weight of 4,4'-biscyclohexanol as the starting diol. A 90% yield of 4,4'-biscyclohexylamine was obtained.

Example 13

Example 1 is repeated except that the starting diol is 4,4'-methylene dicyclohexanol and the reaction is carried out for 1 hour at 300° C. An excellent yield of 4,4'-methylene dicyclohexylamine is obtained.

Example 14

Example 1 is repeated except that the starting diol is 4,4'-ethylidene dicyclohexanol and the reaction is carried out for 30 minutes at 350° C. An excellent yield of 4,4'-ethylidene dicyclohexylamine is obtained.

Example 15

Example 1 is repeated except that the starting diol is 4,4'-beta-butylidene dicyclohexanol and the reaction is carried out for 15 minutes at 360° C. An excellent yield of 4,4'-beta-butylidene dicyclohexylamine is obtained.

Example 16

Example 1 is repeated using 4,4'-gamma-pentylidene dicyclohexanol to produce 4,4'-gamma-pentylidene dicyclohexylamine with excellent results.

Example 17

Example 1 is repeated using 4,4'-cyclopentylidene dicyclohexanol to produce 4,4'-cyclopentylidene dicyclohexylamine with excellent results.

Example 18

Example 1 is repeated using 4,4'-cyclohexylidene dicyclohexanol to produce 4,4'-cyclohexylidene dicyclohexylamine with excellent results.

Example 19

Example 1 is repeated using 4,4'-hexahydrobenzylidene dicyclohexanol to produce 4,4'-hexahydrobenzylidene dicyclohexylamine with excellent results.

Example 20

Example 1 is repeated using amounts of ammonia varying from 15 to 300 parts by weight with satisfactory results.

Example 21

To a 400 cc. shaker tube is charged 100 parts by weight of 4,4'-isopropylidene diphenol, 3 parts by weight of a catalyst of 5% by weight of ruthenium on alumina, and 35 parts by weight of dioxane. The contents of the shaker tube are heated to 200° C. and hydrogenated at 5000 pounds per square inch gauge of hydrogen pressure. The reaction is complete in 3 minutes. The contents are reduced to room temperature and the pressure released. To the vessel is now added 100 parts by weight of ammonia and the contents heated at 275° C. for two hours. The contents of the vessel were cooled, the pressure reduced and the catalyst removed by filtration. The filtrate is then distilled to obtain an 82% yield of 4,4'-isopropylidene dicyclohexylamine for a conversion of 95% of the diol.

Example 22

Example 21 is repeated except in place of the dioxane there is used 50 parts by weight of water. The hydrogenation time is 35 minutes, with similarly excellent results.

Example 23

To a 400 cc. shaker tube is charged 75 parts by weight of 4,4'-biscyclohexanol, 50 parts by weight of ammonia and 2 parts by weight of a catalyst of 5% ruthenium on alumina. The contents of the shaker tube are heated to 275° C. for two hours. Following the recovery procedures of Example 1, there is obtained a 90% yield of 4,4'-biscyclohexylamine.

Example 24

Using as a reaction vessel a stainless steel 70 gallon capacity hydrogenation converter there is charged to the vessel 200 pounds of 4,4'-isopropylidene bis-phenol, 10 gallons of dioxane and 8 pounds of a catalyst of 5% ruthenium on alumina. The contents of the vessel are hydrogenated at 210° C. and about 3500 pounds of hydrogen pressure per square inch gauge. Hydrogenation was complete in about 90 minutes following which about 25 gallons of liquid ammonia is pumped into the vessel and the contents of the vessel held at about 310° C. for about 7 hours while agitating the contents by sparging into the reaction mass additional liquid ammonia at a rate of about 1 gallon per 30 minutes and while continually bleeding gases off the top of the converter to maintain more or less constant pressure within the vessel. After this amination, the contents of the vessel are recovered as in Example 1 to obtain an excellent yield of 4,4'-isopropylidene dicyclohexylamine.

Examples 25–30

Example 21 is repeated except substituting the catalyst listed in the following examples for the catalyst of Example 21. Similar excellent results are obtained.

| | Example |
|---|---|
| Iridium | 25 |
| Rhodium on alumina support | 26 |
| Rhenium | 27 |
| Osmium | 28 |
| Palladium on boehmite alumina monohydrate support | 29 |
| Activated cobalt catalyst | 30 |

I claim:

1. The process comprising reacting in the liquid phase a diol compound selected from the group consisting of

and

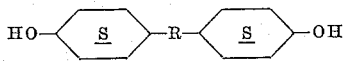

where R is selected from the group consisting of methylene, isopropylidene, ethylidene, beta-butylidene, beta-pentylidene, gamma-pentylidene, cyclopentylidene, cyclohexylidene and hexahydrobenzylidene, with at least a stoichiometric amount of ammonia, at a temperature from about 200° to 400° C. and at autogenous pressure, in the presence of a catalytic amount of a hydrogenation catalyst selected from the group consisting of nickel, cobalt, platinum, palladium, ruthenium, rhenium, iridium, osmium, and rhodium, to produce the corresponding diamino compound selected from the group consisting of

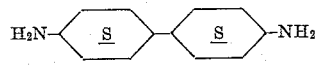

and

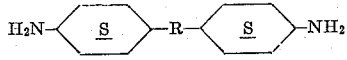

where R has the same meaning as above.

2. The process as set forth in claim 1 wherein said temperature is from 275° to 315° C.
3. The process as set forth in claim 1 wherein said ammonia is used in an amount of from 4 to 10 mols of ammonia for each mol of said diol compound.
4. The process as set forth in claim 1 wherein said hydrogenation catalyst is nickel.
5. The process as set forth in claim 1 wherein said hydrogenation catalyst is cobalt.
6. The process as set forth in claim 1 wherein said hydrogenation catalyst is ruthenium.
7. The process as set forth in claim 1 wherein said diol compound is bis-cyclohexanol.
8. The process as set forth in claim 1 wherein R is methylene.
9. The process as set forth in claim 1 wherein R is isopropylidene.
10. The process as set forth in claim 1 wherein R is ethylidene.
11. The process as set forth in claim 1 wherein R is beta-butylidene.
12. The process as set forth in claim 1 wherein R is beta-pentylidene.
13. The process as set forth in claim 1 wherein R is gamma-pentylidene.
14. The process as set forth in claim 1 wherein R is cyclopentylidene.
15. The process as set forth in claim 1 wherein R is cyclohexylidene.
16. The process as set forth in claim 1 wherein R is hexahydrobenzylidene.

References Cited by the Examiner

UNITED STATES PATENTS

| 1,982,985 | 12/1934 | Ernst et al. | 260—563 |
| 2,606,927 | 8/1952 | Barkdoll et al. | 260—563 |
| 3,153,088 | 10/1964 | Arthur | 260—563 |

OTHER REFERENCES

Houben-Weyl: "Methoden der Organischen Chemie," vol. XII, Stickstoffverbindungen II, pages 126–7 (1957).

Popov et al.: "Chemical Abstracts," vol. 45, page 2881 (1951).

ROBERT V. HINES, *Assistant Examiner.*

CHARLES B. PARKER, *Primary Examiner.*